(12) United States Patent
Taguchi

(10) Patent No.: US 6,181,515 B1
(45) Date of Patent: Jan. 30, 2001

(54) LID SPRING ENGAGEMENT ASSEMBLY FOR LID ASSEMBLY OF A TAPE CASSETTE

(75) Inventor: Osamu Taguchi, Miyagi (JP)

(73) Assignee: Sony Corporation, Tokyo (JP)

( * ) Notice: Under 35 U.S.C. 154(b), the term of this patent shall be extended for 0 days.

(21) Appl. No.: 08/506,342

(22) Filed: Jul. 24, 1995

(30) Foreign Application Priority Data

Jul. 27, 1994 (JP) .................................................... 6-175302
Oct. 14, 1994 (JP) .................................................... 6-249268

(51) Int. Cl.$^7$ .................................................... G11B 23/02
(52) U.S. Cl. .................................................... 360/132
(58) Field of Search ........................... 360/132; 242/347

(56) References Cited

U.S. PATENT DOCUMENTS 3,900,172   8/1975   Kamaya .
4,180,220   12/1979  Shiba .

FOREIGN PATENT DOCUMENTS

| 0 169 544 | 1/1986  | (EP) . |
| 0 169 545 | 1/1986  | (EP) . |
| 0 384 786 | 8/1990  | (EP) . |
| 0 287 664 | 10/1998 | (EP) . |
| 2 187 711 | 9/1987  | (GB) . |
| 2 248 823 | 4/1992  | (GB) . |

Primary Examiner—A. J. Heinz
(74) Attorney, Agent, or Firm—Frommer Lawrence & Haug, LLP.; William S. Frommer; Matthew K. Ryan

(57) ABSTRACT

A recording/reproducing tape cassette attached with an improved lid is provided. The cassette comprises a cassette body accommodating therein a cassette tape a part of which is exposed outside and a rotatable lid mechanism for clamping the exposed part of the tape. The lid mechanism is provided with a rotary shaft including a guide portion eccentric therewith and a torsion coil spring fitted on the guide portion. When the rotary shaft rotates, the guide portion rotates eccentric therewith and the torsion coil spring moves in a direction in which it does not interfere with a tape end detecting optical path located near the rotary shaft so that the torque on the torsion coil spring can be increased to smoothly open and close the lid. Further, the rotary shaft may be provided with a rib so that a lid spring for constantly urging the lid toward a direction in which the lid is closed may engaged the rib without bending thereby reducing the space to be occupied by the spring.

8 Claims, 15 Drawing Sheets

LID SPRING ENGAGEMENT ASSEMBLY FOR LID ASSEMBLY OF A TAPE CASSETTE

BACKGROUND OF THE INVENTION

1. Field of the Invention

The present invention relates to a recording/reproducing tape cassette attached with a lid and more particularly to improvements in the lid spring used for the lid capable of rotatably clamping the upper and rear surfaces of the exposed portion of the tape and the lid spring engagement portion.

The present invention further relates to an improvement in a lid mechanism for a recording/reproducing tape cassette for the purpose of smoothing the opening and closing operations of the lid and more particularly, to a tape cassette structure having a lid which is made to open and close quickly by suitably setting the position of an elastic member guide portion located close to a tape end detecting optical path for detecting the amount of tape so that the force of the elastic member becomes variable.

2. Description of the Related Art

A prior art recording/reproducing tape cassette 60 attached with a lid comprises a substantially square front shell 2, a reel portion 5 comprised of a pair of reels 4 around which a tape 3 is wound, a lid mechanism 61 including a rotatable lid for clamping the upper and rear surfaces of a part of the tape exposed outside the cassette 60 and a substantially square lower shell 37 capable of engaging the upper shell, as shown in FIG. 9.

As shown in FIG. 9, the upper shell 2 is formed of a substantially square insulating member and is provided with a pair of top-lid guide grooves 7, respectively, which are formed on both longitudinal side surfaces thereof so as to extend rearwardly from the front surface, a pair of front-lid rotating shaft bearing portions 8, a pair of tubular lower shell engagement projections 9 and a back-lid engagement portion 10 of a predetermined length formed by recessing the central portion of the front edge of the upper shell 2.

The lid mechanism 61 comprises a top-lid 12, a back-lid 17, a front-lid 21 and a lid spring 65 in the form of an elastic torsion coil spring. The lid mechanism 61 operates such that when the cassette 60 is in use, it leaves away from the tape 3 as it opens to release the tape clamped thereby.

As shown in FIG. 9, the top-lid 12 is rectangular and comprises two longitudinal side walls 13, a pair of front-lid engagement holes 14 formed inside the side walls 13 in opposite relationship with each other with each being in the form of a partly recessed blind hole, a pair of upper shell engagement projections 15 respectively formed on the side walls 13 at positions behind the front-lid engagement holes 14 so as to be guided by the top-lid guide grooves 7 and a pair of back-lid engagement projections 16 formed on the inner surface of the top-lid 12 in spaced apart relationship with each other inwardly of the side walls 13 so as to engage the back-lid 17.

As shown in FIG. 9, the back-lid 17 has a horizontally elongated triangular lower portion and an elongated plate-like tape retaining surface 18A for clamping the exposed portion of the tape 3. Further, one side surface of the triangular lower portion of the back-lid 17 is provided with a lower shell guide projection 19 interlocking with the tape clamping and unclamping operations and the upper end of the tape retaining surface 18A is provided at both ends thereof with a pair of top-lid engagement projections 20.

As shown in FIG. 9, the front-lid 21 comprises an elongated flat base plate portion 22, a pair of front-lid retaining portions 23 extending from both ends of the base plate portion 22 in a direction intersecting the longitudinal direction of the latter, a pair of top-lid engagement projections 20A to engage the top-lid 12 and a tape retaining surface 18B formed on the rear side of the base plate portion 22 so as to clamp the tape.

The front-lid retaining portions 23 are provided with lid-rotating shafts 62 and 35, respectively, which are different in structure and which face each other inwardly right and left and are also provided with tongue-like lid-engagement pieces 26 at positions near the free ends thereof, respectively.

As shown in FIGS. 10 and 11, the lid rotating shaft bearing portion 62 (see the leftside of FIG. 9) is an engagement portion for the lid mechanism 6 and comprises a axial portion 27 rotatably engageable with a front-lid rotating shaft bearing portion 8 and a front-lid engagement portion 41, a support shaft 63 coaxial with the axial portion 27 for mounting a lid spring 65 thereon and a flange portion 64 of an enlarged diameter provided between the axial portion 27 and the support shaft 63.

The support shaft 63 has a diameter smaller than the inner diameter of an end turn 66 of the lid spring 65 and is provided with a hook engagement portion 64 projecting from a portion of the support shaft 63 in a direction intersecting at right angles with the axis of the support shaft 63.

As shown in FIGS. 12 and 13, the lid spring 65 may comprise the end turn 66 wound in the form of a torsion coil spring, an arm portion 67 formed by linearly expanding one end of the end turn 66 and a semi-circular hook portion 66 formed by raising the end turn portion 66 of a diameter Dc upward by 90°. In that case, the distance between the end turn portion 66 and the free end of the hook portion 68 is dc and it is therefore necessary to increase the width wa for accommodating the lid spring 65 shown in FIG. 10.

Therefore, as shown in FIG. 13, the hook portion 69 is made to have a limited height Y in such a manner that after a wire having an end turn is raised upward by 90°, the wire is reprocessed to reduce the diameter dh of the semi-circular portion of the wire. Thus, the width wb can be increased to allow the lid spring 65 to be mounted on the front-lid rotating shaft bearing portion 8 support shaft 63.

The lid rotating shaft 35 (the right side in FIG. 9) comprises a shaft 36 rotatably engageable with the front-lid rotating shaft bearing portion 8 of the upper shell 2 and the front-lid rotating shaft engagement portion 41 of the lower shell 37.

As shown in FIG. 9, the lower shell 37 is substantially square in shape so as to engage the upper shell 2 and is provided with a pair of lid engagement portions 40 on both shorter sides thereof.

The assembly of the tape cassette 60 having a lid comprising the various kinds of parts described above is performed in such a manner that the pair of reels 4 having the tape wound therearound are first mounted in the lower shell 37, then the back-lid 17, the top-lid 12 and the front-lid 21 are brought into engagement with one another and then with the upper shell 2 and the lid spring 65 is fitted on the support shaft 63 to thereby complete the lid mechanism 61. Then the lid mechanism 61 is placed over the lower shell 37 while it is kept opened against the force of the lid spring 65 to thereby complete the assembly of the cassette 60.

Further, as shown in FIG. 21, a prior art recording/reproducing cassette with a lid is provided with a lid mechanism comprising, in combination, a top lid 118, a front lid 109 and a back lid 115 and provided on the front surface of a combined structure of an upper shell 102A and a lower shell 102B.

These lids 118, 109 and 115 are made to open and close in interlocking relationships with one another as they are guided by grooves formed in the shells 102A and 102B such that when the cassette 1 is not in use, the tape is protected by being clamped between a front lid 109 and a back lid 115 while when the cassette 1 is in use, the lids move upward as they release the tape from its clamped state allowing a part of the tape to become exposed outside completely.

The closing operation of the lids 118, 109 and 115 is effected by the elastic force of a torsion coil spring 121 fitted on a guide portion 114A coaxial with a lid rotating shaft 113A of the lid mechanism.

Further, the position of the guide portion 114A is close to a tape end detecting optical path 122 and usually it is substantially the same size as the lid rotating shaft 113A for rotating the lid mechanism. Further, the distance between the guide portion 114A and the tape end detecting optical path 122 is, as shown in FIG. 21, is formed to a size such that when the torsion coil spring 121 is mounted, the end of the spring 121 does not block at lease the tape end detecting optical path 122. Accordingly, the torsion coil spring 121 is made to have a predetermined outer diameter.

As prior art cassette techniques, the following three patent applications are proposed by the present applicant.
1. U.S. Pat. No. 4,989,111
2. U.S. Pat. No. 5,024,394
3. Japanese Patent Application No. H05010347
(Note: Each of the above applications is owned by the assignee of the present invention and is hereby incorporated by reference.)

Problems Sought to be Solved by the Invention

However, the structure of the above-described prior art tape cassette has had the problems that since the diameter of the hook portion 69 of the lid spring 65 has to be reduced after once raising up the end turn portion of the spring by 90°, the bending process for the spring becomes complicated and the workability of the spring becomes bad.

Further, the prior art structure has also had the problem that in order to reduce the diameter of the hook portion 69, if the diameter of the end turn of the lid spring 65 is made equal to the diameter of the hook portion 69, the magnitude of the force of the spring 65 required for closing the lid mechanism becomes weak failing to obtain the maximum stress to be applied on the spring.

Accordingly, it has been demanded to provide a lid spring structure which has a reduced height while keeping the maximum stress to be applied on the conventional spring.

However, the above-described prior art tape cassette attached with the lid mechanism has had the problem that the torsion coil spring guide portion is formed coaxial with the rotary shaft for opening and closing the lid mechanism and therefore, when the diameter of the torsion coil spring blocks the tape end detecting optical path so that the torsion coil spring can not have sufficient force to close the lid mechanism.

Accordingly, for solving the above problem, it has been necessary to provide a lid structure in which the diameter of the torsion coil spring can be varied while keeping the lid mechanism rotating shaft positioned close to the tape end detecting optical path.

SUMMARY OF THE INVENTION

Means for Solving the Problems

In order to solve the above-described problems, the tape cassette according to the present invention comprises a shell assembly comprised of a square upper shell and a square lower shell, a plate housed within the shell assembly provided with a lid rotatable through a rotary shaft while clamping the upper and lower surfaces of the tape and a lid spring mounted on the rotary shaft being provided with an engagement portion with which the end of the lid spring is held in engagement without being bent.

Further, the rotary shaft includes an axial portion for rotating the lid in engagement with the upper and lower shells and a support shaft coaxial with the axial portion and adapted to mount the lid spring thereon through a flange, the engagement portion is provided with a rib arranged at a portion extending from the flange in the direction of the support shaft and having an engagement groove into which one end of the lid spring fixedly inserted.

In order to solve the above-described problem, the cassette with a lid according to the present invention is in the form of a recording/reproducing tape cassette having a lid mechanism wherein a tape is mounted in the cassette so as to travel freely and the lid mechanism is made to open and close by means of an elastic member so as to cover a part of the tape with the lid mechanism comprising a rotary shaft and a guide portion eccentrically formed on a part of the rotary shaft so as to mount the elastic member thereon.

Further, the tape cassette of the present invention features that it is provided with a tape end detecting optical path arranged at a position close to the rotary shaft so as to detect the amount of tape, the guide portion formed on the rotary shaft can rotate eccentrically in a direction in which it does not interfere with the tape end detecting optical path and the elastic member is in the form of a torsion coil spring.

Operation

The cassette with a lid according to the present invention is provided with the lid engagement portion with which one end of the lid spring for constantly urging the rotatable lid of the lid mechanism in its closing direction is held in engagement without being bent, so that it is possible to reduce the height of the spring thereby reducing the mounting space for the spring.

Further, since the lid spring is not required to have a hook portion, the shape of the spring can be simple and the dispersion of the effective opening angle of the spring can be reduced.

In addition, since the size of the width of the spring is not limited, it is possible to reduce the stress to be applied on the spring by increasing the diameter of the wire material for the spring and the number of windings of the spring.

In the tape cassette with a lid according to the present invention, the lid mechanism rotating shaft is housed in the recording/reproducing cassette comprising an upper and a lower shell and the guide portion is provided eccentrically on the rotary shaft so that the guide portion can rotate eccentrically with the rotary shaft in a direction in which it does not interfere with the tape end detecting optical path. The guide portion is provided close to the existing tape end detecting optical path and therefore, even when the outer diameter of the torsion spring is made large to allow the spring to have a sufficient force for closing the lid mechanism, the tape end detecting optical path is not blocked by the coil spring.

Effects of the Invention

As described above, the tape cassette according to the present invention has an extremely excellent effect that since one end of the lid spring for always urging the rotatable lid of the lid mechanism toward its closed state is held in engagement with the engagement portion provided on the lid rotating shaft without bending that end, the spring is not required to have a hook portion as has been required in the prior art device so that the installation space for the spring can be reduced.

The tape cassette of the present invention has also another extremely excellent effect that since the lid spring has no hook portion, it becomes no more necessary to raise any hook portion from the end turn of the spring resulting in improving productivity and reducing the manufacturing cost.

Further, the tape cassette of the present invention has a still another excellent effect that since a sufficient space is obtained in the direction of the width of the lid spring when the lid spring is mounted on the engagement portion, it is possible to reduce the stress applied to the spring by enlarging the diameter of the spring wire material and increasing the number of windings and also to reduce the manufacturing cost by using an inexpensive material having a small allowable stress.

Still further, the tape cassette attached with a lid according to the present invention is extremely advantageous in that the guide portion on which the torsion coil spring is fitted is provided eccentrically on the rotary shaft of the lid mechanism so that the torsion coil spring as an elastic member shifts as it rotates to make the guide portion biased in a direction in which it does not interfere with the optical path and allows the lid mechanism to be opened and closed smoothly by engaging the diameter thereof.

DETAILED DESCRIPTION OF PREFERRED EMBODIMENTS

Figure 1:
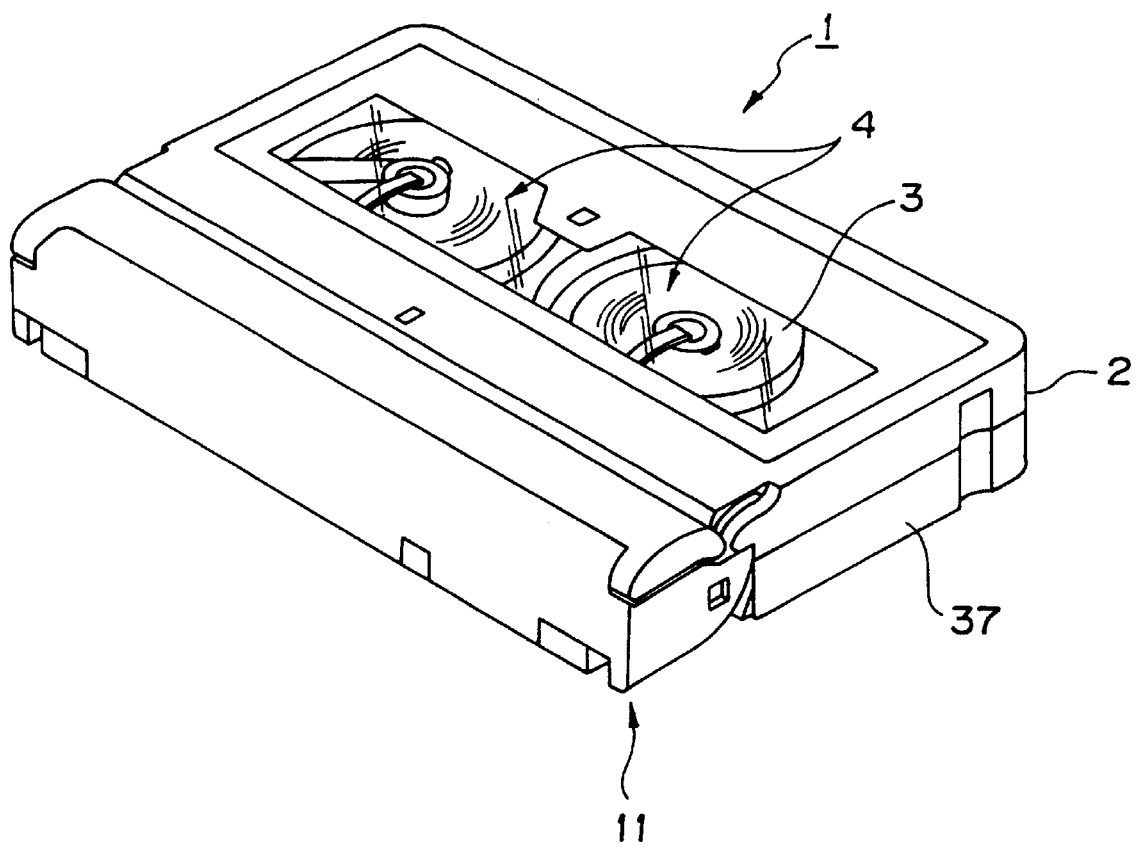
FIG. 1 is a perspective view of a tape cassette with a lid in its entireties according to the present invention.

Preferred embodiments of a tape cassette with a lid according to the present invention will now be described by referring to the accompanying drawings wherein like parts are designated by like reference numerals with respect to a prior art tape cassette in order for the structure of the tape cassette to be easily understood.

A first preferred embodiment of the present invention will be first described

As shown in FIG. 1, the tape cassette 1 is square in shape and comprises an upper shell 2, a rotatable lid mechanism for keeping the cassette in its closed state by the action of a lid spring 28 when the cassette 1 is not in use, a reel portion 5 comprised of a pair of tape reels 4 housed within the cassette 1 and around which a recording/reproducing tape 3 is wound, a lower shell 37 and a lid engagement member 47 for locking the lid mechanism in its closed state.

The tape cassette 1 of the above-described structure protects the tape 3 in such a manner that when the tape 3 which is partly exposed outside the front surface of the cassette 1 is clamped by the force of the lid spring 28. Further, when the cassette 1 is in use, the lid mechanism 11 is moved upward against the force of the lid spring 28 to release the clamped tape to become exposed outside the cassette 1.

Figure 2:
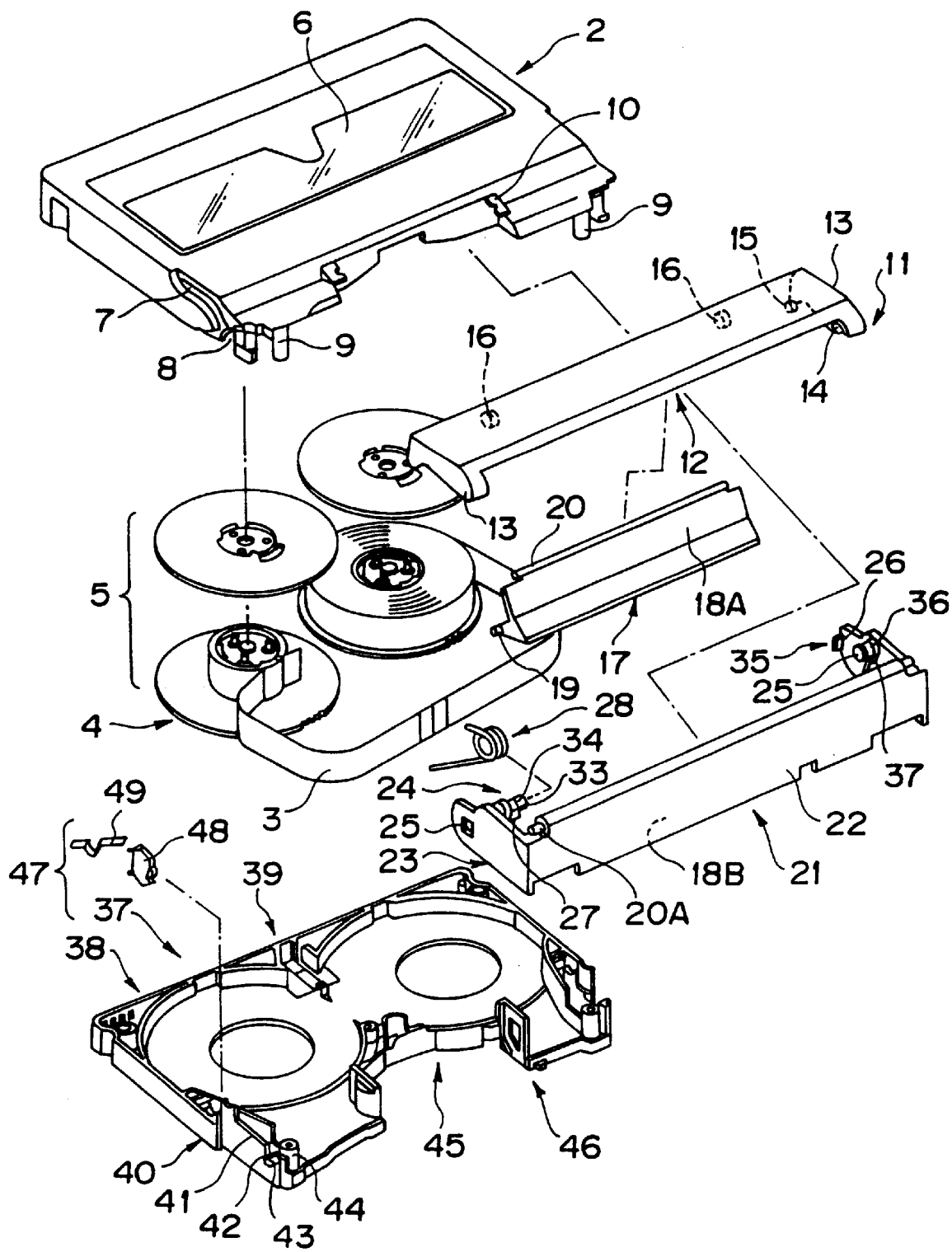
FIG. 2 is an exploded perspective view of the tape cassette shown in FIG. 1.

As shown in FIG. 2, the upper shell 2 is made of a substantially square insulating member and a rectangular transparent member 6 occupying the central portion thereof so as to allow the movement of the reel 5 comprised of the pair of tape reels 4 to be easily observed from outside. Further, on both longitudinal side surfaces of the tape cassette 1 there are provided a pair of top-lid guide grooves 7 extending rearwardly from the front surface of the upper shell 2, a pair of semicircular front lid rotating shaft bearing portions 8 arranged close to the top-lid guide grooves, respectively, and a pair of tubular lower shell engagement projections 9. Further, there are provided a pair of back-lid engagement portions 10 formed by recessing the central portion of the front edge of the upper shell 2.

As shown in FIG. 2, the lid mechanism 11 guides the tape 3 into a recording/reproducing mechanism of an electronic device such as a Digital VTR by opening and closing when the cassette 1 is mounted in the device. It comprises a top-lid 12, a back-lid 17, a front lid 21 and a torsion coillike lid spring 28.

As shown in FIG. 2, the top-lid 12 is rectangular and comprises both side walls 13, a pair of front-lid engagement projection holes 14 each in the form of a recessed blind-hole and provided on the internal surfaces of the side walls 13, respectively, in opposite relationship with each other, a pair of upper shell engagement projections 15 provided on the side walls 13 at positions behind the engagement projection holes 14, respectively, so as to be guided by the top-lid guide grooves 7, respectively, and a pair of back-lid engagement projections 16 provided inwardly of the side walls 13 in spaced apart relationship with each other so as to engage the back-lid 17.

As shown in FIG. 2, the back-lid 17 is elongated in shape with the lower portion thereof being substantially triangular and the surface thereof forms itself an elongated tape retaining surface 18A for clamping the rear surface of the portion of the tape 3 exposed outside from the upper and lower shells 2 and 37, in cooperation with the tape retaining surface 18B of the front-lid 21 when the cassette 1 is not in use. On one of the side surfaces of the triangular portion there is formed a pair of lower shell guide projections 19 interlocking with the opening and closing operations of the clamped tape 3 by being guided by the lower shell 37 and the upper edge of the tape retaining surface 18A is provided with a pair of rodlike top-lid engagement projections 20 at both ends thereof so as to engage the top-lid 12.

As shown in FIG. 2, the front-lid 21 comprises an elongated flat base plate 22, a pair of front-lid retaining portions 23 provided at both ends of the flat base plate 22 so as to extend in a direction intersecting the longitudinal direction of the base plate, a pair of top-lid engagement projections 20A provided at both ends of the front-lid retaining portions 23 so as to engage the top-lid 12 and a tape retaining surface 18 forming the rear surface of the flat base plate 22 and adapted to clamp the tape 3 in cooperation with the back-lid 17.

The front-lid retaining portions 23 are provided with lid rotating shafts portions 24 and 35 of different structures on the inner surfaces thereof, respectively, in opposite relationship with each other, light-path holes 25 and tongue-like lid engagement strips 26 near the free ends thereof and outside the light-path holes.

Figure 5:
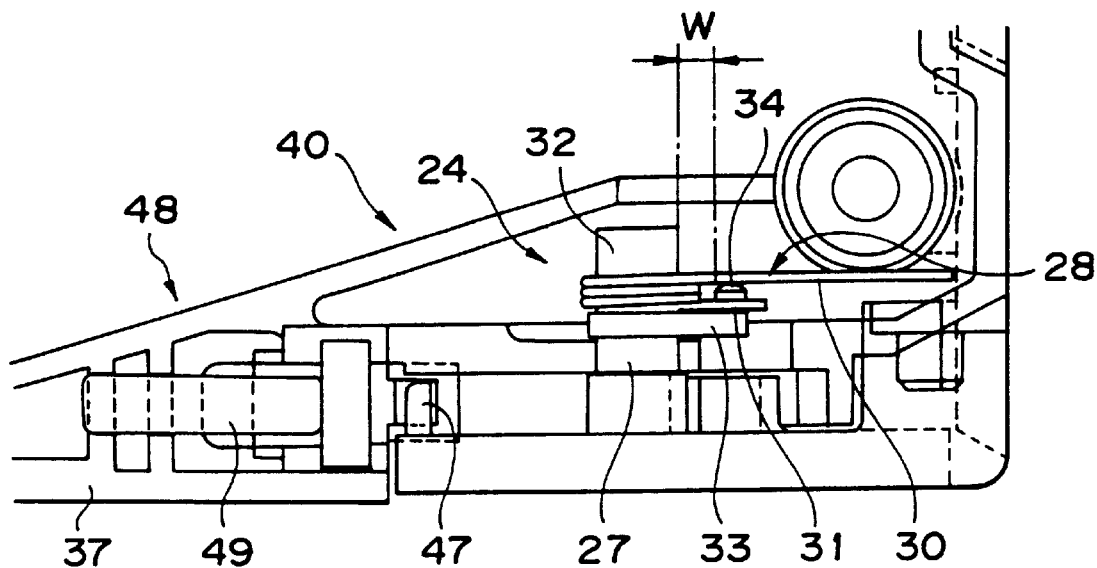
FIG. 5 is a schematic illustrative view of an essential portion of the tape cassette in which the lid spring of FIG. 3 is mounted.
Figure 6:
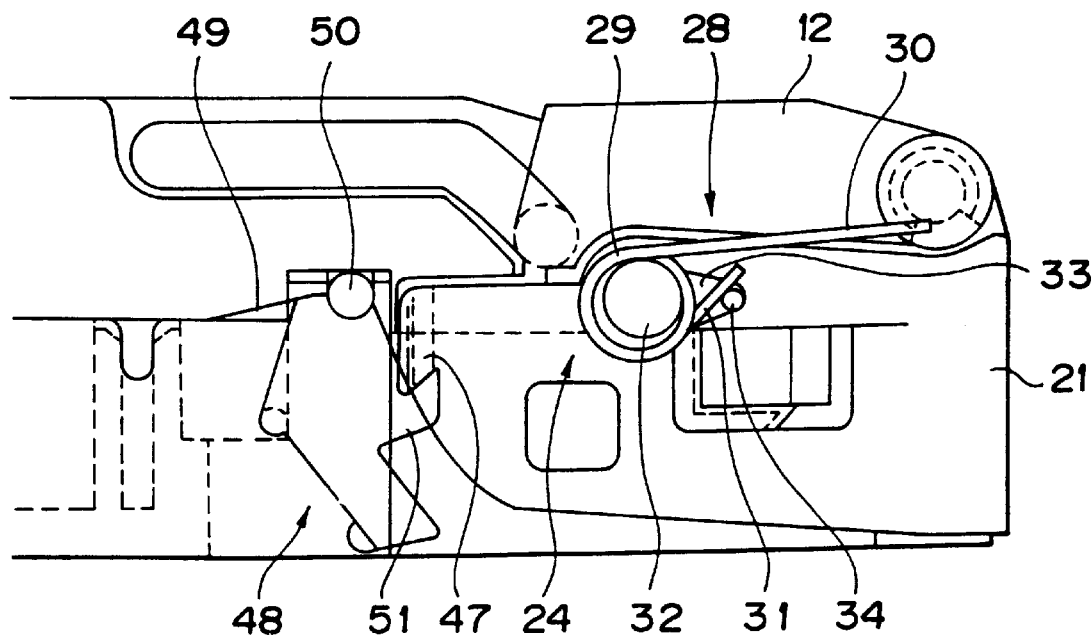
FIG. 6 is a schematic illustrative view of a spring engagement portion of the cassette tape shown in FIG. 5.

As shown in FIGS. 5 and 6, the lid rotating shaft portion 24 (left side in FIG. 2) comprises an axial portion 27 rotatably engaging the front-lid rotating shaft bearing portion 8 of the upper shell 2 and the front-lid rotating shaft engagement portion 41, a support shaft 32 coaxially extending from the axial portion 27 so as to mount the lid spring 28 thereon and a flange 33 provided between the axial portion 27 and the support shaft 32.

Figure 3:
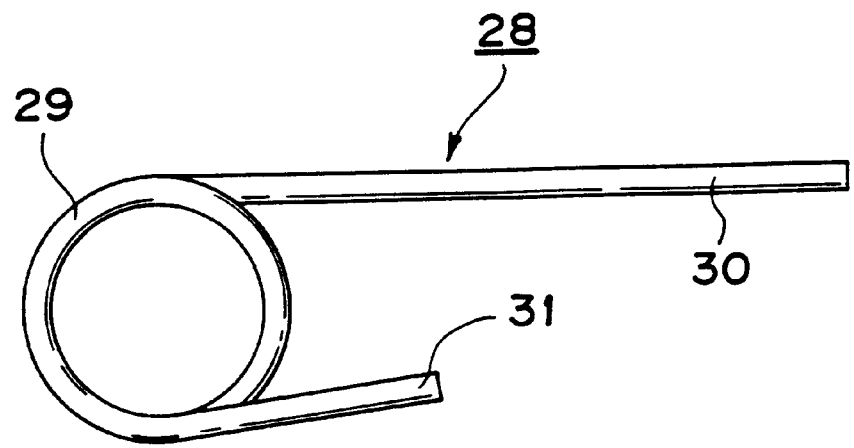
FIG. 3 is a plan view of a lid spring used in the cassette shown in FIG. 1.
Figure 4:
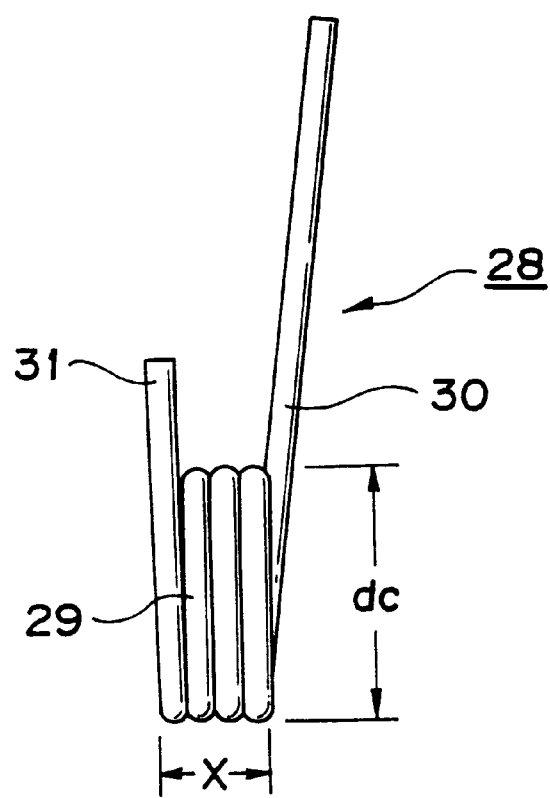
FIG. 4 is a side view of the lid spring shown in FIG. 3.

As shown in FIGS. 3 and 4, the lid spring 28 is a so called torsion spring and comprises a coiled end turn portion 29, a first arm 30 linearly extending from one side of the end turn portion 29 and a second arm 31 extending from other side of the end turn portion 29 in a direction at a certain angle with respect to the direction of extension of the first arm 30 with the arm 30 being longer than the arm 31. The lid spring of the above-described structure has the function such that when the ringlike end turn portion 29 is fitted about the support shaft 32, the free end of the first arm 30 is held in engagement with the front-lid 21 (not shown) and the free end of the second arm 31 is held in engagement with the engagement rib 34 of the flange 33 of the front-lid retaining portion 23, the lid mechanism 11 is constantly urged toward the direction in which it is closed.

As shown in FIGS. 5 and 6, the support shaft 32 is a coaxial extension of the axial portion 27 separated by the flange 33 and the diameter thereof is smaller than the inner diameter of the end turn portion 29 and the height thereof is sufficiently larger than the width of the end turn portion 29, for example, about two times the latter.

As shown in FIGS. 5 and 6, the flange 33 is provided between the axial portion 27 and the support shaft 32 with a portion thereof extending in a direction intersecting at right angles with the support shaft and the engagement rib 34 is provided at the projecting end so as to run parallel the support shaft 32. The engagement rib 34 is spaced from the support shaft 32 by a distance W. On such flange 33, the end turn 29 of the lid spring 28 is loosely fitted about the support shaft 32, the second arm 31 of the lid spring 28 is hooked on the engagement rib 34 and the first arm 30 is hooked on the front rib 21 as it is biased. In this case, the relationship between the support shaft 32 and the end turn 29 is such that unlike the conventional practice of providing a width Y between the end turn 29 and the second arm 31 is not required but only the provision of a width X of the end turn 29 (see FIG. 4) is sufficient so that the height of the support shaft 32 can be reduced by a length corresponding to the width Y or it is possible to obtain a sufficient fitting condition of the lid spring 28.

The lid rotating shaft 35 (rightside in FIG. 2) comprises an axial portion 36 rotatably engaging the front-lid rotating shaft bearing portion 8 of the upper shell 2 and the front-lid rotating shaft engagement portion 41, a right-angled dust-proof rib 43 adjacent to the axial portion 36, a light-path hole 25 and a lid engagement strip 26.

As shown in FIG. 2, the lower shell 37 is square in shape so as to engage the upper shell 2, and comprises an external terminal connecting portion 38 at one end of the rear side surface thereof, a reel lock mechanism 39 provided at the center of the rear side surface thereof, a pair of lid engagement portions 41 each defined substantially triangular from nearly the center of each of both sides toward the front, a pair of optical path recessed portions 42, a pair of dustproof ribs 43, a pair of upper shell engagement projections 44, a light source insert portion 45 provided at the center of the front side thereof and having a hole for receiving a light source from outside and a pair of back-lid guide portions 46 provided on both sides of the light source insert portion 45.

As shown in FIGS. 2, 5 and 6, the lid engagement member 47 comprises a lid engagement claw 48 and a flat leaf spring 49 whose one end is U-shaped.

The lid engagement claw member 48 comprises a rotary shaft 50 extending horizontally on both sides thereof and a claw 51 provided at the lower art thereof with the tip of the claw facing upward at an angle of about 45 degrees. The lid engagement member 47 and the leaf spring 49 are so arranged that the rotary shaft 50 is hung over the lid engagement portions 40 of the lower shell 37 with the claw 51 held downward and the upper portion of the engagement claw portion is compressed to constantly thrust the claw 51 forward by the other end of the leaf spring 49.

The assembly of the tape cassette comprising the above-described various kinds of parts is performed as follows. First, the pair of reels 4 having the tape 3 wound therearound are mounted on the lower shell 37. Then the back-lid 17 is engaged with the top-lid 12 and the latter is engaged with the front-lid 21. These lids may be assembled from the beginning.

Next, the lid assembly is engaged with the upper shell 2 and the lid spring 28 is fitted about the support shaft 34 of the front-lid 21 thereby completing the assembly of the lid mechanism 11. Then the lid mechanism 11 is held open against the force of the lid spring 28 and caused to cover the lower shell 37 thereby completing the assembly of the cassette 1.

The lid spring 28 constituting the lid rotating shaft 24 housed in the assembled cassette 1 includes two linear portions, namely, the first arm 30 to be fixed to the upper shell 2 and the second arm 31 to be fixed to the lid in contrast to the prior art cassette in which the terminating end of the spring to be fixed to the lid is in the shape of a semicircular hook. Consequently, it is possible to reduce the space for accommodating the spring and at the same time, prevent the maximum stress applied on the spring from becoming deteriorated. Further, the shape of the lid spring can be simple thereby reducing the dispersion of the effective opening angle of the spring. Further, the lid spring 28 of such structure has a reduced width X (see FIG. 4) so that it is possible to reduce the stress to be applied on the spring by enlarging the diameter of the spring wire material and increasing the number of windings of the spring to that degree and at the same time, to reduce the manufacturing cost by using an inexpensive material having a small allowable stress.

Next, a second embodiment of the present invention uses the above-described lid spring 28 as it is while modifying the flange and the engagement rib provided on the support shaft 32.

Figure 7:
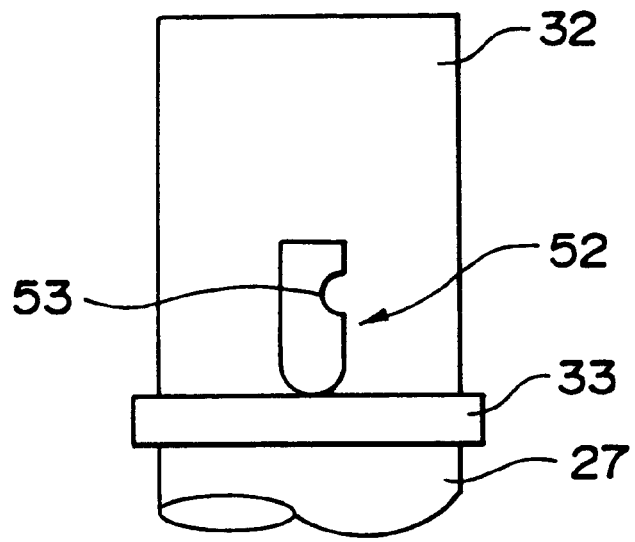
FIG. 7 is a schematic illustrative view of a spring engagement portion of a cassette tape according to a second embodiment of the present invention.
Figure 8:
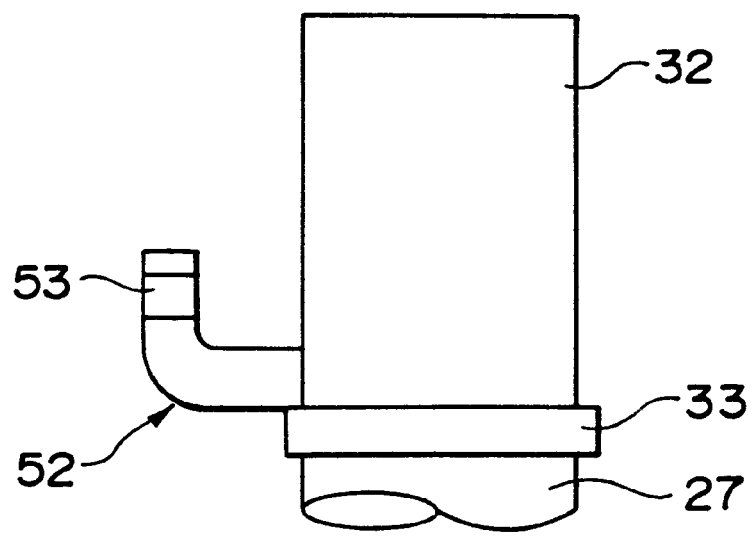
FIG. 8 is a schematic illustrative view of the spring engagement portion of the cassette tape according to the second embodiment of the present invention.
Figure 9:
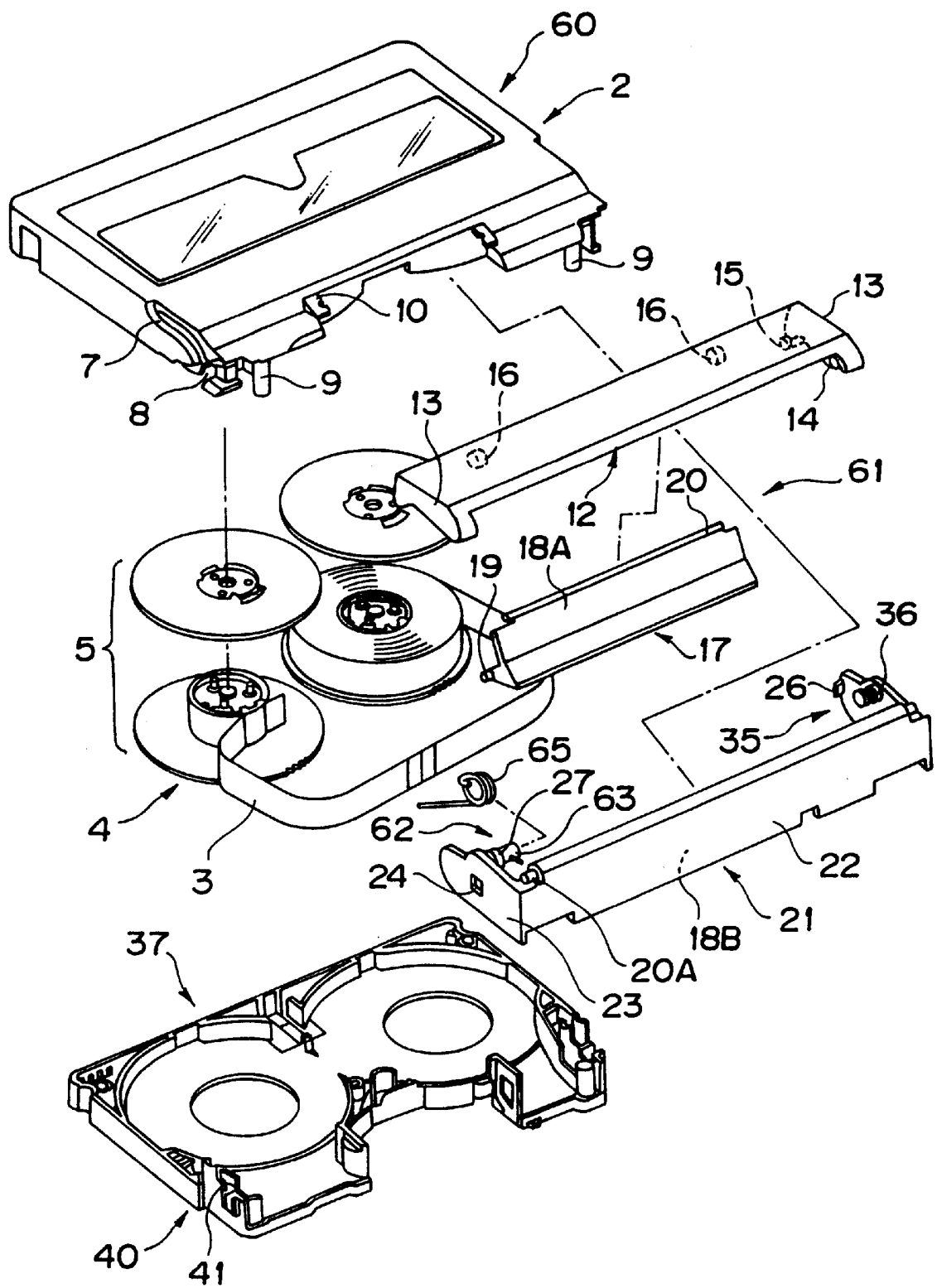
FIG. 9 is an exploded perspective view of a prior art tape cassette with a lid.
Figure 10:
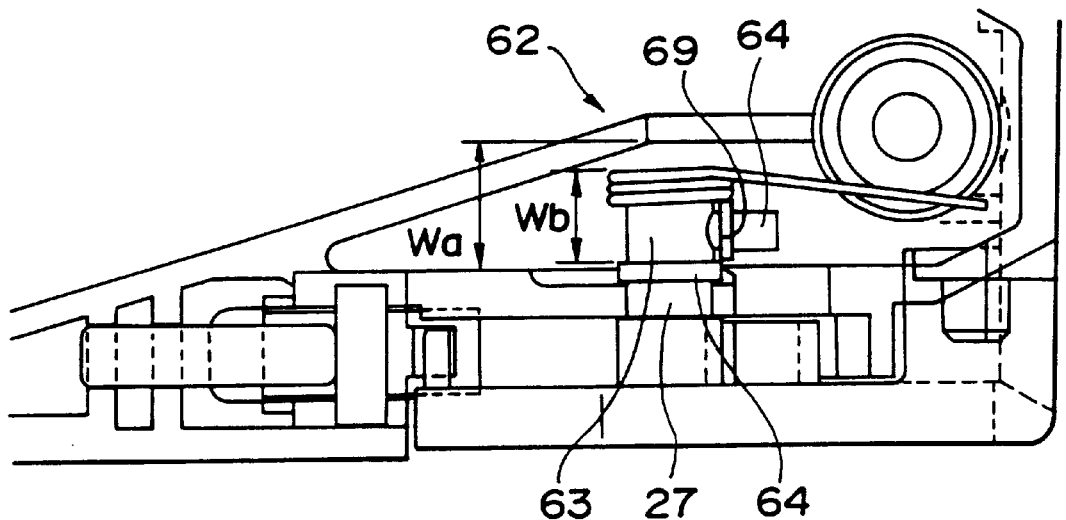
FIG. 10 is a schematic illustrative view of an essential portion of a lid spring engagement portion of the prior art tape cassette.
Figure 11:
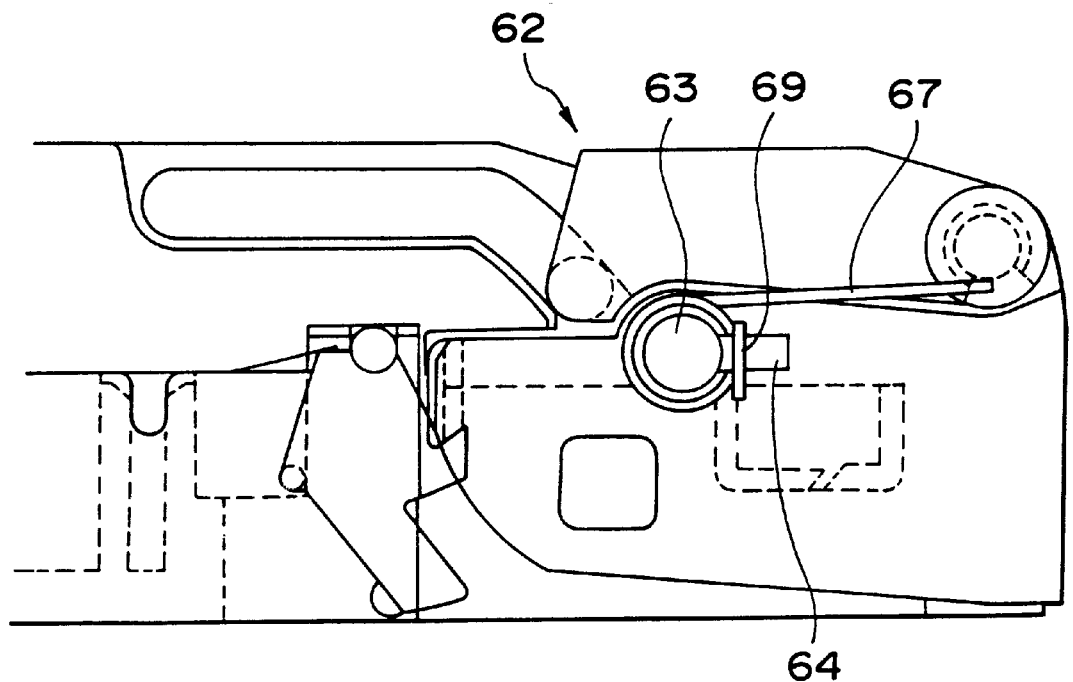
FIG. 11 is an illustrative view of the essential portion of the lid spring engagement portion of the prior art tape cassette.
Figure 12:
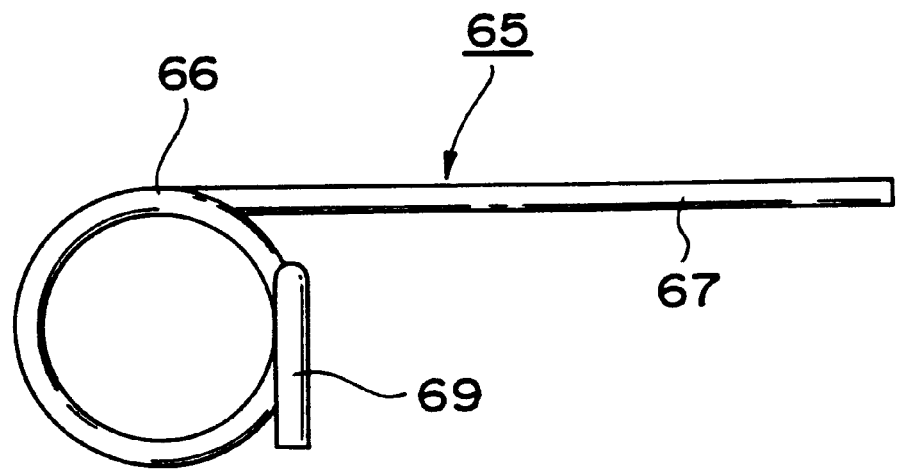
FIG. 12 is a plan view of a lid spring of the prior art tape cassette.
Figure 13:
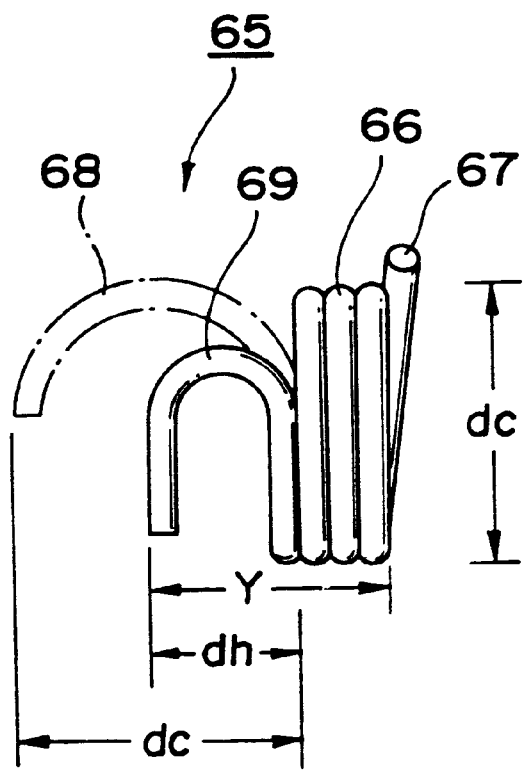
FIG. 13 is a side view of the lid spring shown in FIG. 12.

That is, as shown in FIGS. 7 and 8, an engagement rib 52 in the form of an upward facing hooklike engagement groove is provided at a position close to the flange which is larger in diameter than the support shaft 32 and the axial portion 27. The engagement rib 52 is provided with a recess 53 for preventing the lid spring 28 from shifting sidewardly or from slipping out therefrom.

Another embodiment of the tape cassette with a lid according to the present invention will now be described in detail with reference to the accompanying drawings wherein like parts are designated by like reference numerals with respect to the prior art technique.

Figure 14:
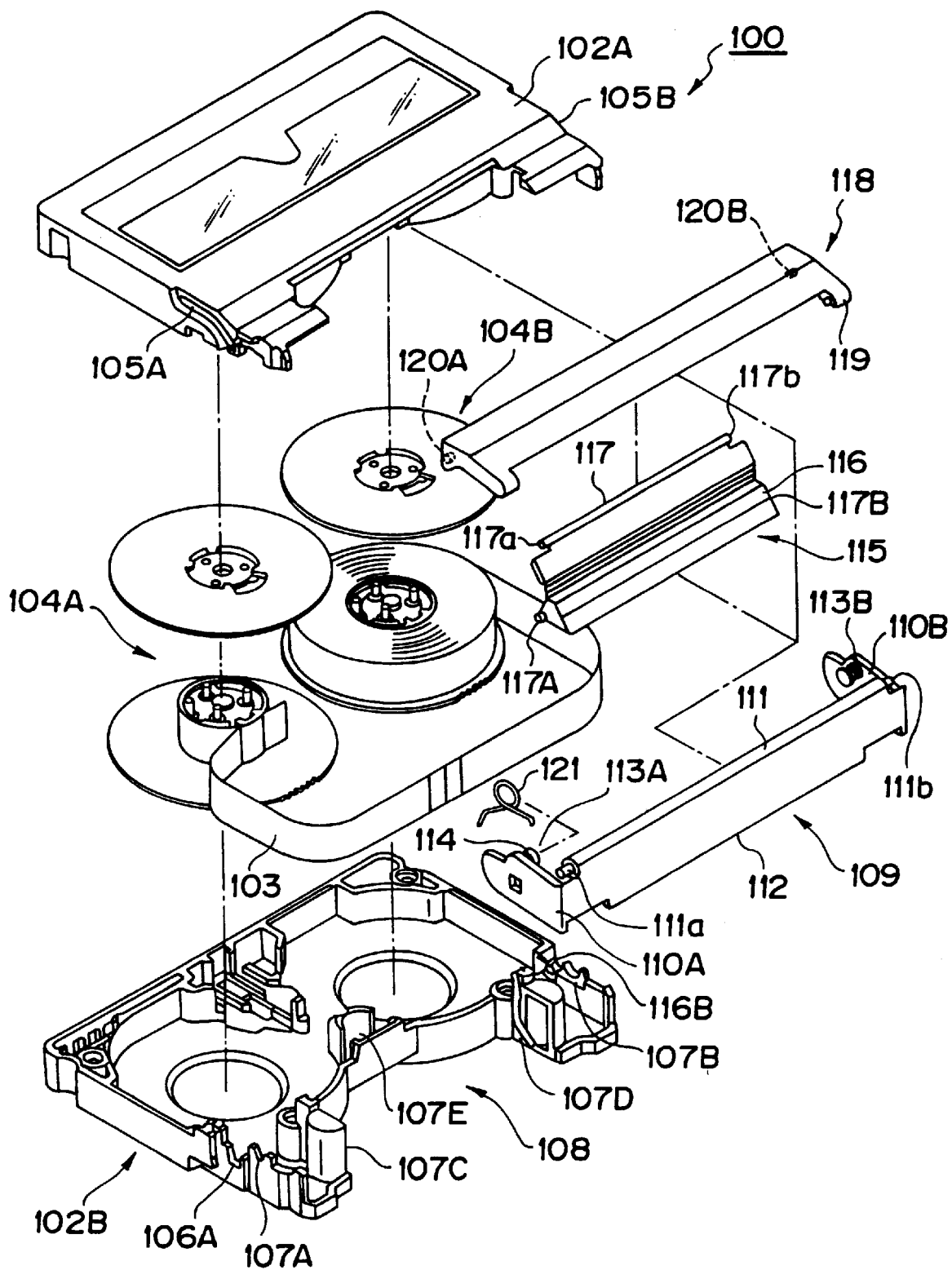
FIG. 14 is an exploded perspective view of the tape cassette of the present invention in its entireties.

Referring to FIG. 14, a recording/reproducing tape cassette 101 is formed of an square upper shell 102A and a lower shell 102B corresponding in shape to the former and houses therein a pair of tape reels 104A and 104B around which a recording/reproducing tape 103 is passed and an opening and closing portion 108 which is formed on the front surface of the cassette 100 which is provided with a lid mechanism.

The upper shell 102A is provided with top lid guide grooves 105A and 105B on the longitudinal side surfaces thereof, respectively.

The lower shell 102B is provided, on the longitudinal side surfaces thereof, with optical path recesses 106A and 106B, front lid rotating shaft bearing portions 107A and 107B engaging a front-lid rotating shaft, back-lid guide portions 107C and 107D for guiding a back-lid in a direction in which the back-lid leaves away from the tape when the lid mechanism is opened and a light source insert hole 107E into which a light source is inserted from outside.

The opening and closing portion 108 guides the tape to a recording/reproducing mechanism of an electronic device such as a digital VTR when the recording/reproducing cassette 101 is mounted in the device and it comprises a front-lid 109, a back-lid 115, a top lid 118 and a torsion coil spring 121 as an elastic member.

The front lid 109 is in the form of a thin and elongated strip and is provided on both ends thereof with top-lid retaining portions 110A and 110B, respectively, which extend normal to the front lid, a top lid engaging portion 111 on the longitudinal top end thereof and a tape retaining surface 112 to hold the tape on the rear surface thereof (when viewed from FIG. 1). Further, at both ends of the top-lid engaging portion 111 there are provided projections 111a and 111b which engage projection holes 19 of the top lid 109, respectively.

The lid retaining portions 110A and 110B are respectively provided with lid rotating shafts 113A and 113B inwardly facing each other of which the shaft 113A (leftside in the drawing) is provided with a guide portion 114 thereon so as to mount a torsion coil spring 121 thereon. The guide portion 114 is eccentric with the center of the shaft 113A.

Figure 16:
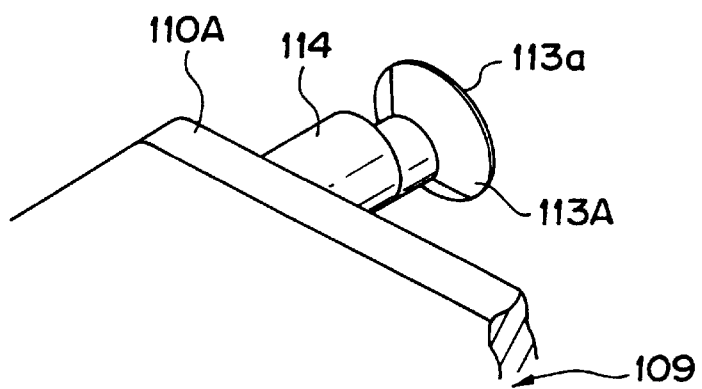
FIG. 16 is an enlarged perspective view of an essential portion of a front lid retaining portion of a lid mechanism of the tape cassette shown in FIG. 14.

That is, as shown in FIG. 16, the lid retaining portion 110A of the front lid 109 is provided with the lid rotating shaft 113A with the guide portion 114 eccentric with the center of the shaft 113A and the free end of the shaft 113A is provided with a lid slippage preventive guide 113a.

The back-lid 115 is elongated in shape with the lower portion thereof being substantially triangular and the surface thereof forms itself a tape retaining surface 116 for retaining a part of the tape 103 in cooperation with the tape retaining surface 112 of the front-lid 109 when the cassette 101 is not in use. On the other hand, the upper part of the back-lid 115 is substantially flat platelike and provided at the top thereof with an engaging portion 117 engaging the top-lid 118. At both ends of the engaging portion 117 there are respectively provided engaging projections 117a and 117b which are held in engagement with the top-lid 118 in interlocking relationship with each other. On the other hand, at both longitudinal ends of the lower portion of the engaging portion 117, there are respectively provided projections 117A and 117B which come into engagement with the grooves of the back guides 107C and 107D of the lower shell 102B for guiding the lid mechanism in a direction in which the lid mechanism leaves away from the tape 103 when the lid mechanism is opened.

Figure 17:
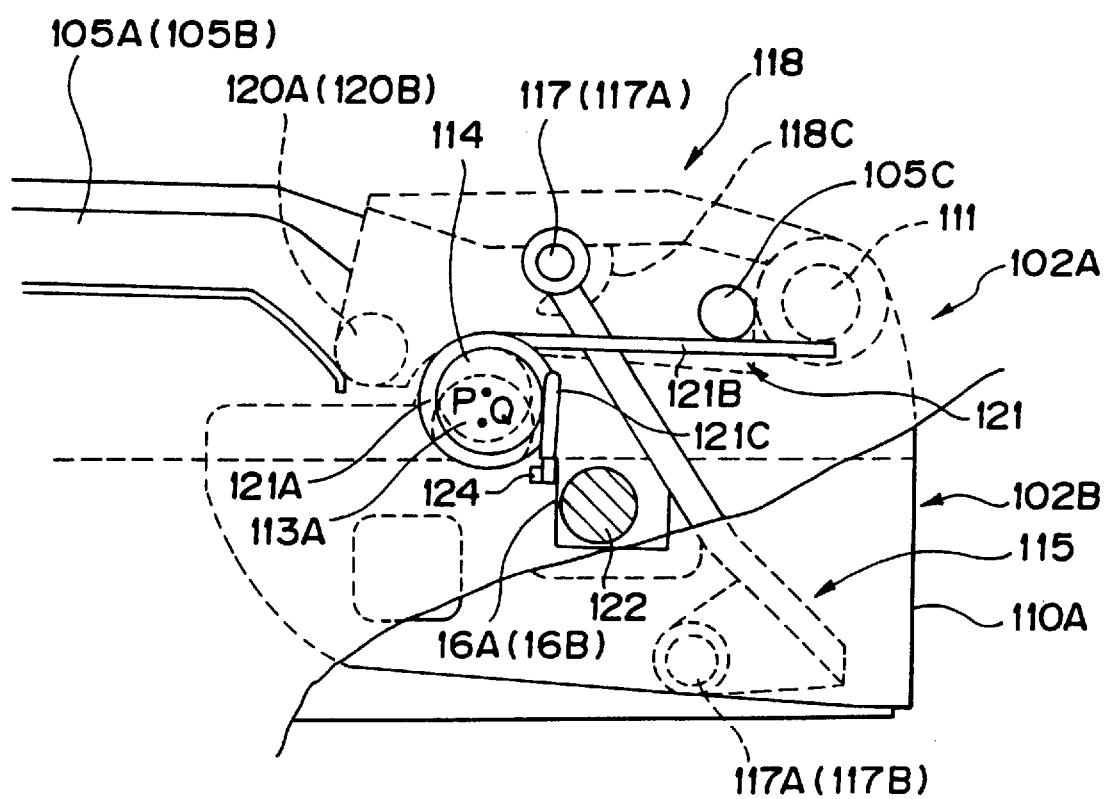
FIG. 17 is a schematic illustrative view of an essential portion of the lid mechanism of FIG. 16 especially when the lid mechanism is opened.
Figure 18:
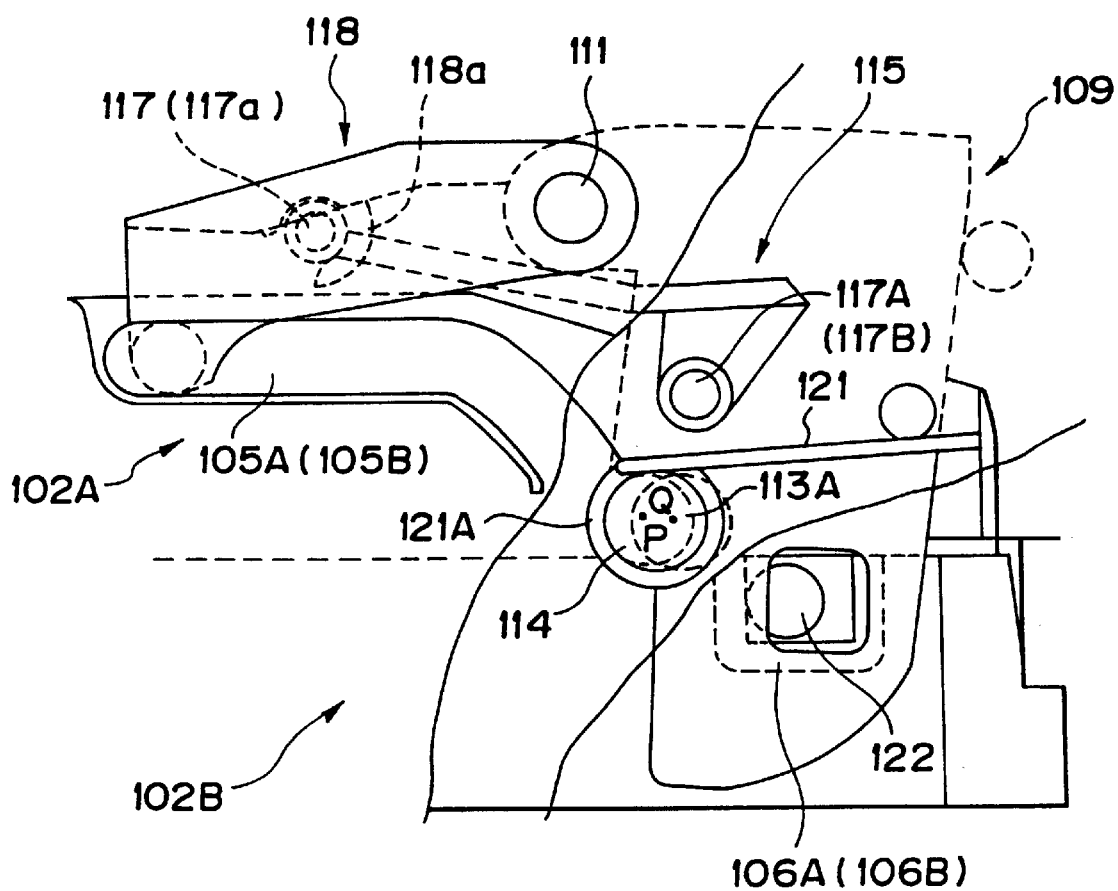
FIG. 18 is an a schematic illustrative view of the essential portion of the lid mechanism of FIG. 17 especially when the lid mechanism is closed.

The top-lid 118 is provided with the front-lid engaging projections 119 formed at the longitudinal front side thereof and at the longitudinal rear side thereof there are provided guide projections 120A and 120B which are guided in the top-lid guide grooves 105A and 105B of the upper shell 102A. Further, as shown in FIGS. 17 and 18, the top-lid 118 is provided at the rear side surface thereof with a hook portion 118a for hooking the engaging projections 117a and 117b of the back-lid 115 so as to open and close the back-lid 115.

The torsion coil spring 121 is end-turned to become coillike with both ends thereof being bent. The torsion spring 121 is mounted on the lid rotating shaft 113A in such a manner that the hollow portion resulting from the end-turning is fitted about the shaft 113A and one end of the spring 121 is held engaged with the front-lid 109 while the other end thereof is held engaged with the upper shell 102A so that the spring 121 may be energized to keep the lid mechanism always opened.

The recording/reproducing cassette 101 having the above-described structure is assembled in such a manner that the projections 111a and 111b of the engaging portion 111 of the front-lid 109 are brought into engagement with the engaging holes 19 of the top-lid and the projections 117A and 117B of the back-lid 115 are brought into engagement with the back-lid guide portions 107C and 107D of the lower shell 102B while the torsion spring 121 is temporarily fixed onto the lid retaining portion 110A of the front-lid 109. Then the guide portions 120A and 120B of the top-lid 118 are brought into engagement with the guide grooves 105A and 105B of the upper shell 102A and the lid rotating shafts 113A and 113B of the front-lid 109 are brought into engagement with the rotary shaft bearing portions 107A and 107B of the lower shell 102B thereby combining together the upper and lower shells 102A and 102B.

Figure 15:
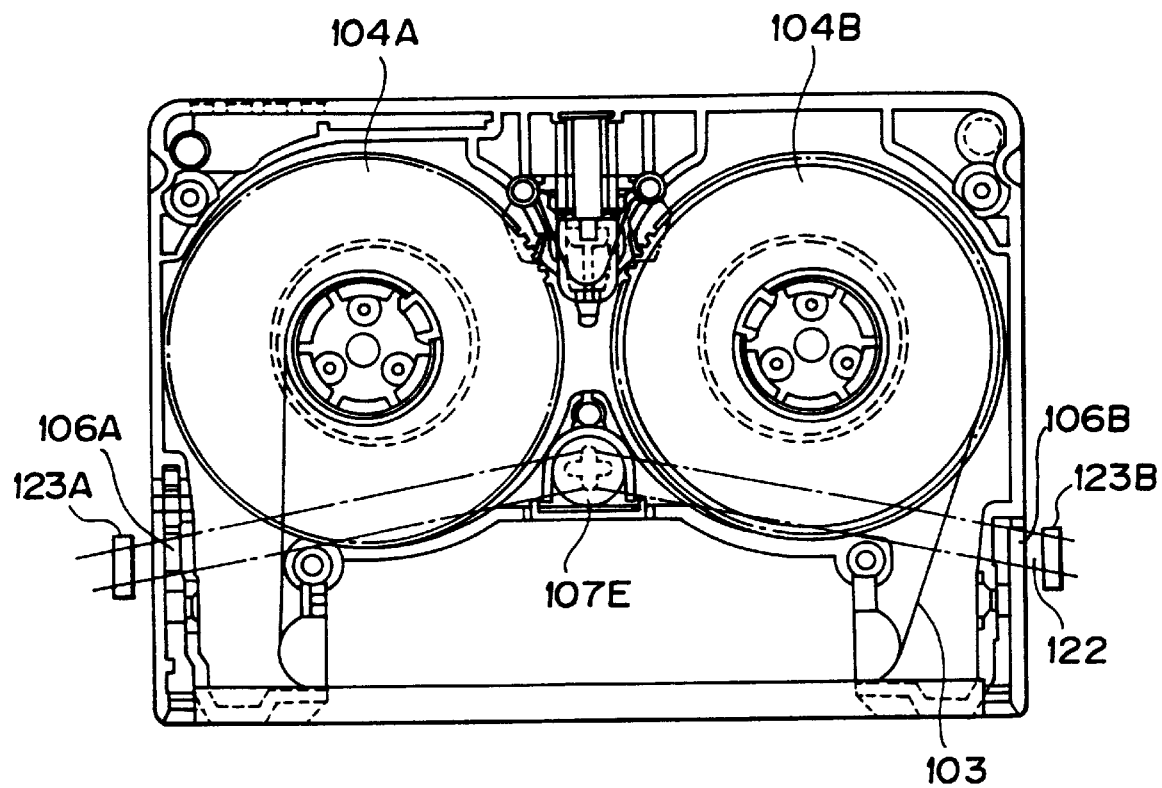
FIG. 15 is a plan view of the tape cassette shown in FIG. 14 with its shell excluded.

At the same time, within the assembly of the upper and lower shells 102A and 102B there may be formed the tape end detecting optical path 122 between the light source insert hole 107E and the optical path recesses 106A and 106B as shown in FIG. 15. The tape end detecting optical path 122 detects the terminating end of the tape 103 by detecting the amount of tape wound around the reels 104A and 104B through detecting portions 123A and 123B arranged outside the optical path recesses 106A and 106B when the cassette q is mounted on an electronic device such as a Digital VTR. That is, the detection of the end of the tape 103 is made by shielding the optical path due to the amount of tape 103 wound around the reels 104A and 104B.

The lid mechanism of the above-described structure is as shown in FIG. 17 wherein when the lid mechanism is closed, the end-turn portion 121A of the torsion spring 121 is fitted about the guide portion 114 and one end 121A of the spring 121 is brought into engagement with the spring engagement portion 105C while the other end 121C of the spring 121 is held engagement with the spring engagement portion 124 of the lower shell 102B. Consequently, the torsion coil spring 121 is always urged in a direction in which the front-lid 109 is closed (i.e., downward in FIG. 17), the back-lid 115 and the top-lid 118 interlocking with the front-lid 109 are indirectly urged downward with a part of the tape 103 being sandwiched between the tape retaining surface 116 of the back-lid 115 and the tape retaining surface 112 of the front-lid 109. In this case, the center position P of the guide portion 114 having the torsion coil spring 121 fitted thereon is located at a position above the center position O of the lid rotating shaft 113A.

Next, when the lid mechanism is opened, the front-lid 109 is rotated upward as shown in FIG. 17 to move upward as it leaves away from the tape 103 sandwiched between it and the back-lid 115 so that a part of the tape 103 is completely exposed outside.

In this case, when the rotary shaft 113A of the front-lid 109 is rotated to the left, the guide portion 114 having the torsion coil spring 121 fitted thereon also rotates to the left from its eccentric position. That is, as shown in FIG. 17, when the lid mechanism is opened, the guide portion 114 provided at its biased position is located on the left side of the lid rotating shaft 113A and so the torsion coil spring 121 fitted on the shaft moves to the left.

Figure 19:
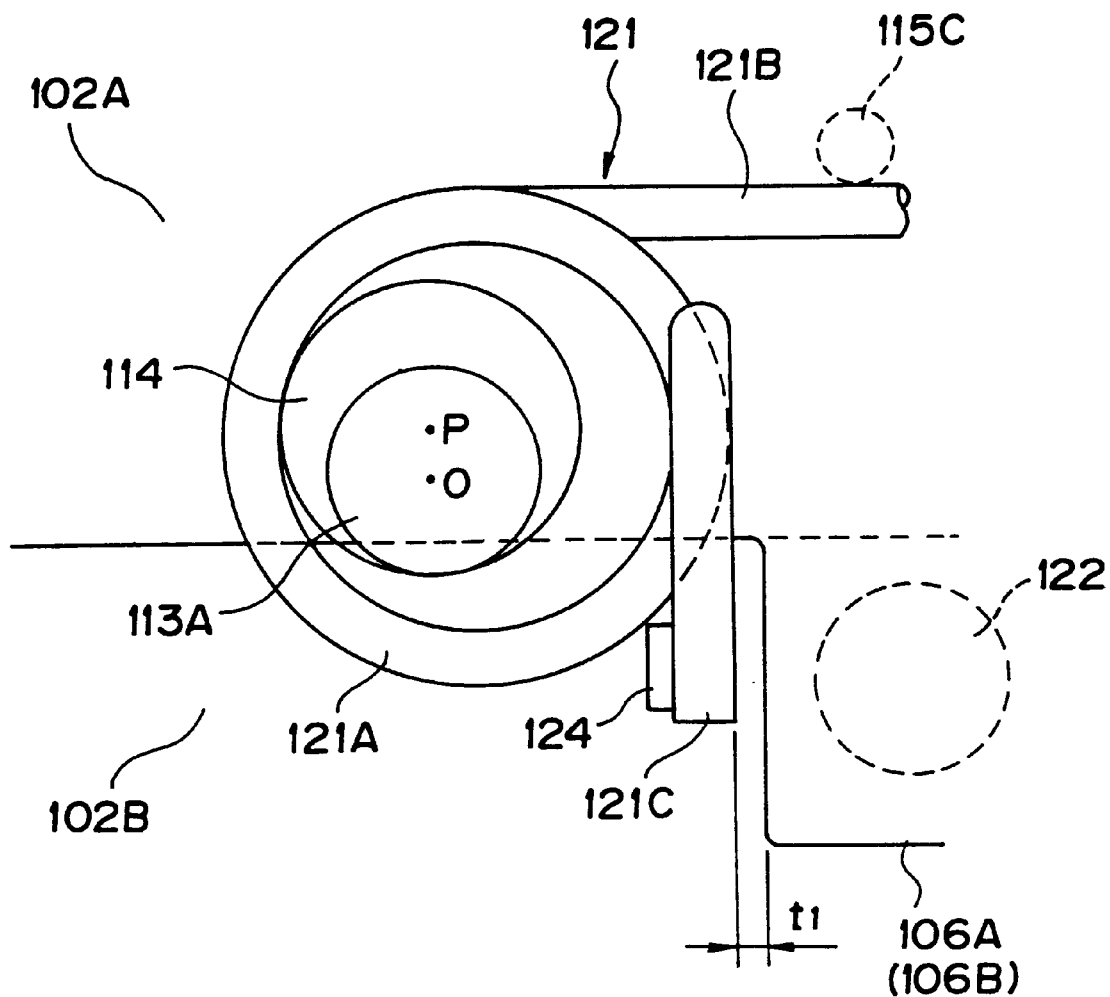
FIG. 19 is an illustrative view of an essential portion of a torsion coil spring of the lid mechanism of FIG. 16 when the lid mechanism is closed.
Figure 20:
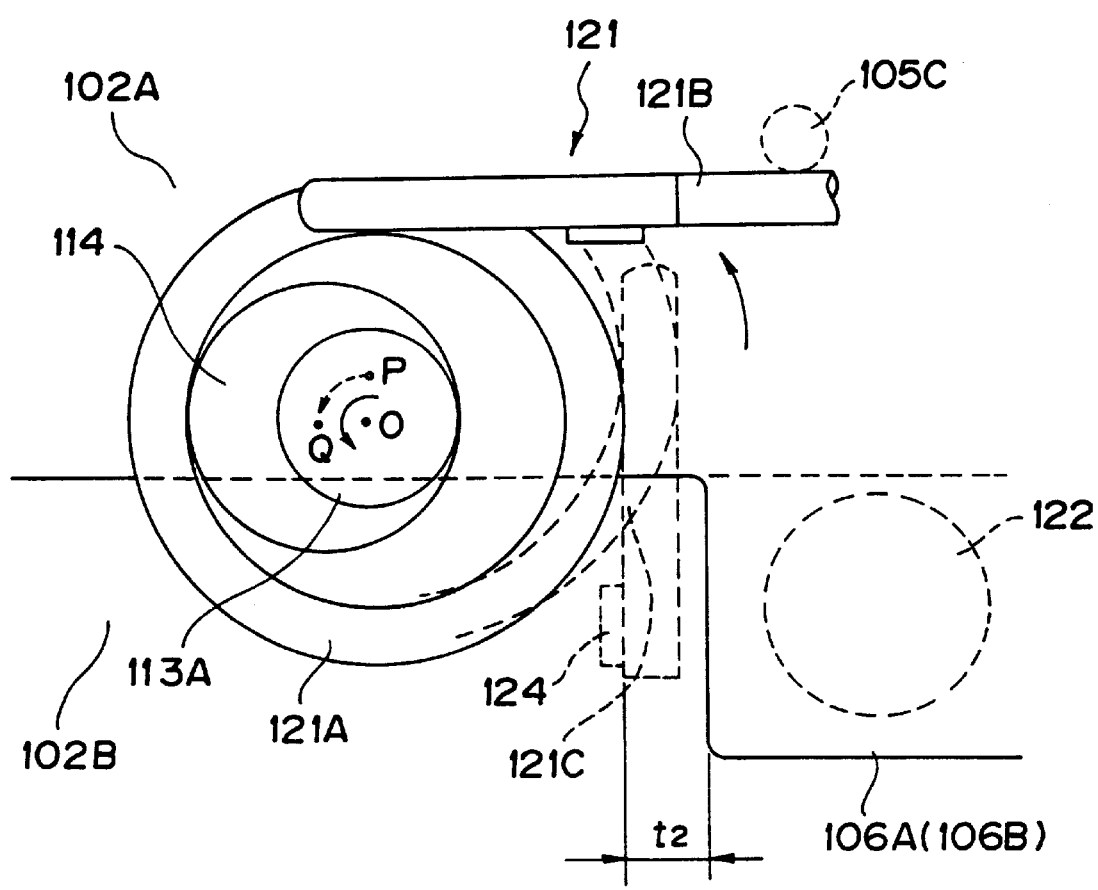
FIG. 20 is an illustrative view of the essential portion of the lid mechanism of FIG. 16 when the lid mechanism is opened.
Figure 21:
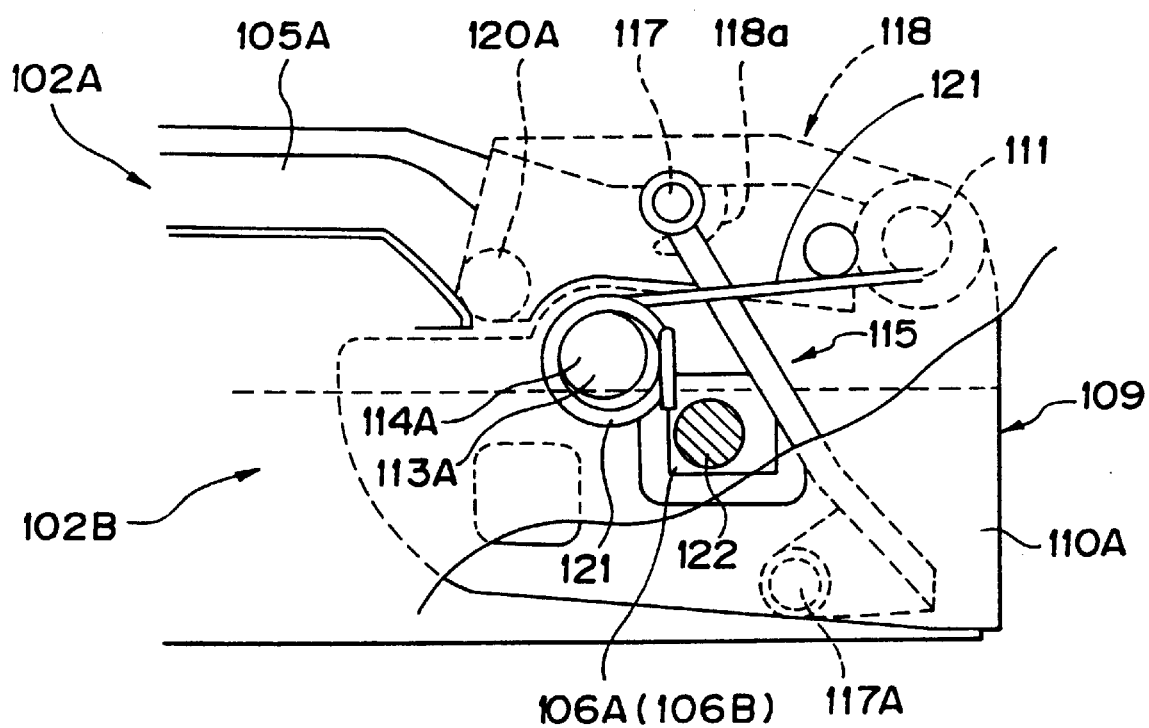
FIG. 21 is an illustrative view of an essential portion of a lid mechanism of the prior art tape cassette when the lid mechanism is closed.

The above operation will be described in more detail by referring to FIGS. 19 and 20. In FIG. 19, when the lid mechanism is closed, the torsion coil spring 121 is fitted on the guide portion 114 having its center P located above the center O of the lid rotating shaft 113A and one end 121B of the torsion coil spring is held in engagement with the spring engaging portion 105C of the upper shell 102A while the other end 121C of the spring is held in engagement with the engaging portion 124 of the retaining portion 110A of the front-lid 109. In this case, the distance between one end of the torsion coil spring 121 held in engagement with the engaging portion 124 of the retaining portion 110A of the front lid 109 and the end of the recess 106A forming the optical path 122 is t1.

When the lid mechanism is opened from the closed state, as the lid rotating shaft 113A is rotated to the left, the guide 114 also rotated to the left at a position separated from the optical path 122 by a distance corresponding to the biased amount. That is, the center P of the guide portion 114 shifts to the position of the center Q in a direction in which it leaves away from the optical path 122. Accordingly, the torsion coil spring 121 also rotates eccentrically following the guide portion to the left to leave away from the optical path 122 together with the guide portion 114, that is, biased to rotate in a direction in which it does not interfere with the optical path 122 and moves to the right with an increasing torque as it somewhat increases the diameter of the end turn 121A. Thus, by increasing the diameter of the end turn 121A and moving the torsion coil spring 121 in a direction away from the optical path 122, even when the lid mechanism is so constructed to increase the torque by increasing the diameter of the torsion coil spring 121, the optical path 122 is not blocked. That is, the distance between the end of the torsion coil spring and the end of the optical recess 106A when the lid mechanism is closed is t2 and the relation of this distance t2 with the distance t1 is always expressed by t1<t2. Accordingly, it is possible to smoothly open and close the lid mechanism by designing the diameter of the torsion coil spring 121 in consideration of the value of the distance t1.

Although the structure of the torsion coil spring has been described in the instant embodiment, it is a matter of course that the structure in which the resilient strip guide portion provided at a biased position on the rotary shaft is covered by the present invention and further, the torsion coil spring may be replaced with a leaf spring made of a thin plate.

What is claimed is:

1. A tape cassette comprising:
    a cassette body formed of an upper and a lower generally square shell;
    a tape having front and rear surfaces accommodated within said cassette body with a part of said tape being supported outside the cassette body;
    a lid mechanism including a lid capable of rotation by means of a rotary shaft while exposing the front and rear surfaces of said part of said tape supported outside the cassette body when said lid is in an opened position;
    a lid spring having unbent ends for constantly urging said rotatable lid toward a direction in which said lid is closed; and
    an engagement portion being mounted to and rotatable with said rotary shaft and having a further portion which is spaced from and extends generally parallel to said rotary shaft for retaining one of said unbent ends of said lid spring in engagement with said engagement portion.

2. A tape cassette according to claim 1, wherein said rotary shaft comprises an axial portion for rotating said lid while said lid is held in engagement with said upper and lower shells, and a support shaft formed as a coaxial extension of said axial portion so as to mount said lid spring thereon through a flange.

3. A tape cassette according to claim 2, wherein said further portion includes a rib at an extended position from said flange parallel to said support shaft.

4. A tape cassette according to claim 3, wherein said rib is provided with an engagement groove for holding one end of said lid spring in engagement with said rib.

5. A tape cassette comprising a tape capable of travelling therein and having a lid mechanism movable to an opened position and a closed position and biased between said opened and closed positions by a biasing member so as to cover a part of the tape when the lid mechanism is in its said closed position, said lid mechanism comprising a rotary shaft having a predetermined diameter and a guide portion integrally formed with said rotary shaft, said guide portion having a further portion which is spaced from and extends generally parallel to said rotary shaft for contacting and holding an end of said biasing member, said further portion being formed on said rotary shaft eccentric with the center of the diameter of the rotary shaft thereby providing means for shifting said biasing member as said biasing member rotates so that said guide portion does not interfere with a tape end detecting optical path.

6. A tape cassette according to claim 5, wherein said tape end detecting optical path detects the amount of tape at a position close to said rotary shaft.

7. A tape cassette according to claim 6, wherein the guide portion formed on said rotary shift is rotatable eccentrically with the rotary shaft in a direction which does not interfere with said tape end detecting optical path.

8. A tape cassette according to claim 7, wherein said biasing member is a torsion coil spring.

* * * * *